United States Patent
Kim et al.

(10) Patent No.: US 10,381,610 B2
(45) Date of Patent: Aug. 13, 2019

(54) SECONDARY BATTERY COMPRISING INSULATOR ASSEMBLY CAPABLE OF SUPPRESSING DAMAGE TO ELECTRODE ASSEMBLY CAUSED BY EXTERNAL FORCE

(71) Applicant: LG Chem, Ltd., Daejeon (KR)

(72) Inventors: Jin Soo Kim, Daejeon (KR); Duk Hyun Ryu, Daejeon (KR); Kwan Soo Lee, Daejeon (KR)

(73) Assignee: LG Chem, Ltd., Daejeon (KR)

( * ) Notice: Subject to any disclaimer, the term of this patent is extended or adjusted under 35 U.S.C. 154(b) by 0 days.

(21) Appl. No.: 15/688,061

(22) Filed: Aug. 28, 2017

(65) Prior Publication Data
US 2018/0062120 A1    Mar. 1, 2018

(30) Foreign Application Priority Data
Aug. 29, 2016 (KR) .................. 10-2016-0109817

(51) Int. Cl.
| | |
|---|---|
| *H01M 10/04* | (2006.01) |
| *H01M 2/02* | (2006.01) |
| *H01M 10/653* | (2014.01) |
| *H01M 10/052* | (2010.01) |
| *H01M 2/16* | (2006.01) |
| *H01M 10/02* | (2006.01) |

(52) U.S. Cl.
CPC ........ *H01M 2/0277* (2013.01); *H01M 2/162* (2013.01); *H01M 2/1686* (2013.01); *H01M 10/02* (2013.01); *H01M 10/0422* (2013.01); *H01M 10/0431* (2013.01); *H01M 10/052* (2013.01); *H01M 10/653* (2015.04)

(58) Field of Classification Search
CPC .................................................. H01M 10/0422
See application file for complete search history.

(56) References Cited

U.S. PATENT DOCUMENTS

| | | | |
|---|---|---|---|
| 8,936,862 B2* | 1/2015 | Kobayashi | H01M 2/02 429/94 |
| 9,023,500 B2* | 5/2015 | Kim | H01M 2/0413 429/94 |
| 9,048,502 B2* | 6/2015 | Sawa | H01M 4/134 |
| 9,147,868 B2* | 9/2015 | Ishihara | B01D 69/125 |

(Continued)

FOREIGN PATENT DOCUMENTS

| | | |
|---|---|---|
| JP | 2000-348771 A | 12/2000 |
| KR | 20-1999-0023885 U | 7/1999 |

(Continued)

*Primary Examiner* — Tho D Ta
(74) *Attorney, Agent, or Firm* — Mintz Levin Cohn Ferris Glovsky and Popeo, P.C.; Kongsik Kim; Jhongwoo Jay Peck

(57) ABSTRACT

A secondary battery includes a container, an electrode assembly received in the container, and an insulator assembly disposed on at least one of an upper end and a lower end of the electrode assembly. When the electrode assembly is moved vertically due to inertia, the insulator assembly is elastically contracted and restored as a reaction to the inertia, thereby reducing pressure generated between an interior surface of the container and the electrode assembly. The insulation assembly may provide insulation effect. It may function as an electrolytic solution flow path.

14 Claims, 7 Drawing Sheets

(56) References Cited

U.S. PATENT DOCUMENTS

| | | | |
|---|---|---|---|
| 9,252,454 B2 | 2/2016 | Kim et al. | |
| 9,350,004 B2 | 5/2016 | Kim | |
| 2013/0252055 A1* | 9/2013 | Kim | H01M 2/12 |
| | | | 429/94 |
| 2017/0092979 A1* | 3/2017 | Chiga | H01M 10/0422 |

FOREIGN PATENT DOCUMENTS

| | | |
|---|---|---|
| KR | 10-0917742 B1 | 9/2009 |
| KR | 2013-0033550 A | 4/2013 |

* cited by examiner

131

FIG. 7A
FIG. 7B
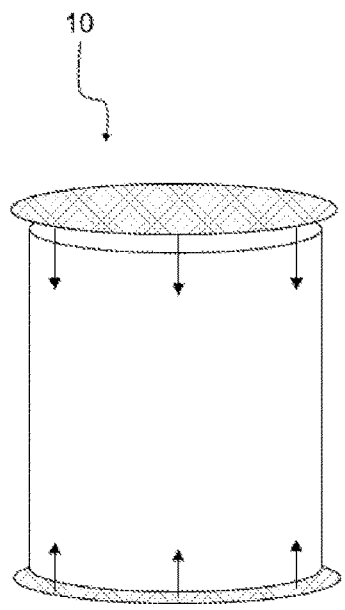
SECONDARY BATTERY
IN RELATED ART
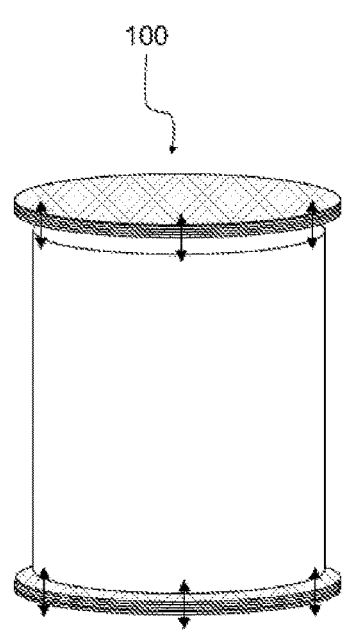
SECONDARY BATTERY
OF PRESENT INVENTION

SECONDARY BATTERY COMPRISING INSULATOR ASSEMBLY CAPABLE OF SUPPRESSING DAMAGE TO ELECTRODE ASSEMBLY CAUSED BY EXTERNAL FORCE

CROSS-REFERENCE TO RELATED APPLICATION

This application claims priority to and the benefit of Korean Application No. 10-2016-0109817 filed on Aug. 29, 2016, which application is incorporated herein by reference.

TECHNICAL FILED

The present disclosure relates to a secondary battery, and more particularly to a secondary battery having an insulator assembly capable of suppressing damage to an electrode assembly caused by an external force.

RELATED ART

Demand for secondary batteries as an energy source has been rapidly increased as technologies for mobile devices have been advanced. Lithium secondary batteries having high energy density and discharge voltage have been intensively studied, actively commercialized, and widely used. The secondary batteries are divided, depending on the shapes of the battery cases, into two types: (1) a cylindrical or square type having an electrode assembly mounted in a cylindrical or square metal container and (2) a pouch type having an electrode assembly mounted in a pouch case made of aluminum laminate sheets. The cylindrical type battery has a relatively greater capacity and is more structurally stable.

The electrode assemblies have a cathode/separating membrane/anode stacked structure and function as generators capable of charging and discharging. The electrode assemblies are divided into two types: (1) a jelly-roll type and (2) a stack type. The jelly-roll type is formed by winding a cathode formed as a long sheet with an active material disposed thereon and an anode formed as a long sheet with an active material disposed thereon, with a separating membrane interposed between the cathode and the anode. The stack type is formed by stacking a plurality of cathodes and anodes having a predetermined size with the separating membranes interposed between the cathodes and the anodes. The jelly-roll type electrode assembly can be more easily manufactured and has a greater energy density per weight.

FIG. 1 schematically illustrates an exemplary perspective view from a vertical section of a common cylindrical battery. A secondary battery 1000 can be manufactured by disposing a jelly-roll type (winding type) electrode assembly 1200, which has insulating plates mounted on the upper and lower ends thereof respectively, in a cylindrical battery container 1300, injecting an electrolytic solution into the cylindrical battery container 1300, and mounting a top cap 1400, which is provided with an electrode terminal (e.g., a cathode terminal (not illustrated)), on an opened upper end of the cylindrical battery container 1300.

The electrode assembly 1200 has a structure with a cathode 1210, an anode 1220 and a separating membrane 1230 interposed between the cathode and the anode. The structure is wound to form a round shape, and a cylindrical center pin 1500 is inserted into the core (e.g., central portion of the jelly-roll) of the round shape. Generally, the center pin 1500 is made of a metal material to provide a predetermined strength and has a hollow cylindrical structure that is obtained by forming (e.g., bending) a plate material into a round shape. The center pin 1500 functions to fix and support the electrode assembly and acts as a passage through which gas generated by chemical reaction while the battery is charged, discharged, and operated is released.

When the battery is moved in a vertical direction, the electrode assembly can be vertically displaced in the cylindrical battery container in response to the vertical movement of the battery. For example, the upper end or the lower end of the electrode assembly may be pressed against an interior surface of the battery container due to the inertia force. When such pressing occurs, the upper end and the lower end of the electrode assembly may be pressed or deformed, thereby rapidly increasing internal resistance or causing a short due to contact between the cathode and the anode. Accordingly, demand for a technology that can fundamentally solve such a problem exists.

The above information disclosed in this section is merely for enhancement of understanding of the background of the disclosure and therefore it may contain information that does not form the prior art that is already known in this country to a person of ordinary skill in the art.

SUMMARY

An aspect of the present invention provides a secondary battery comprising a (battery) container, an electrode assembly, and an insulator assembly. The electrode assembly is disposed in the container. The electrode assembly includes a cathode, an anode, and a separating membrane disposed between the cathode and the anode. The insulator assembly is mounted on an upper end of the electrode assembly, a lower end thereof, or both. When the electrode assembly is moved in a vertical direction due to inertia, the insulator assembly may be elastically contracted and restored as a reaction to the inertia to reduce pressure generated between the electrode assembly and an interior surface of the container.

In an embodiment, the insulator assembly may include a first insulating plate formed of a woven structure of polymer fibers. In another embodiment, the insulator assembly may include a second insulating plate formed of a nonwoven structure of polymer fibers. In still another embodiment, the insulator assembly may include a third insulating plate formed of a nonwoven or woven structure of polymer fibers and provided with a plurality of apertures. In a further embodiment, the insulator assembly may include at least one of the first, second, and third insulator plates. As a non-limiting example, it may include two of the first insulator plates and three of the second insulator plates.

In some embodiments, the insulator assembly may include a first insulator coupled to the upper end of the electrode assembly and a second insulator coupled to the lower end of the electrode assembly. In some further embodiments, the first insulator may comprise a stacked body in which a plurality of the third insulating plates formed of a nonwoven structure of polymer fibers are stacked vertically, a first insulating plate stacked on the stacked body, and another first insulating plate stacked under the staked body. Without intending to limit the scope of the present invention, each of the third insulating plates may have thickness of about 0.2 mm to about 0.5 mm, and each of the first insulating plates may have thickness of about 0.1 mm to about 0.3 mm In an embodiment, the stacked body may have two to four of the third insulating plates formed of a nonwoven structure of polymer fibers, and the thickness of the first insulator may be about 1 mm to about 2 mm.

In some embodiments, nonwoven polymer fibers of each of the third insulating plates may be intertwined with each other to form a space around the intertwined nonwoven polymer fibers. The first insulating plate may be bonded by thermal fusion to a third insulating plate adjacent to the first insulation plate, and the another first insulating plate may be bonded by thermal fusion to a third insulating plate adjacent to the another first insulation plate. In further embodiments, when the electrode assembly is moved upwardly, the space may become smaller or may be removed, and the third insulating plates may become closer to each other. As a result, the first insulator can be contracted along a vertical section thereof. The contraction of the first insulator can reduce upward movement of the electrode assembly and absorb some or all of pressure applied to the upper end of the electrode assembly.

In some embodiments, the third insulating plates may be stacked so that the apertures of each of the third insulating plates are in communication with each other.

In some embodiments, the second insulator may comprise a stacked body in which a plurality of the second insulating plates formed of a nonwoven structure of polymer fibers are stacked vertically, a first insulating plate stacked on the stacked body, and another first insulating plate stacked under the staked body. As a non-limiting example, the stacked body may have first to ten of the second insulating plates formed of a nonwoven structure of polymer fibers.

Without intending to limit the scope of the present invention, the thickness of each of the second insulating plates may be about 0.2 mm to about 0.5 mm, and the thickness of each of the first insulating plates may be about 0.1 mm to about 0.3 mm. Also, without intending to limit the scope of the present invention, the thickness of the second insulator may be about 2 mm to about 5 mm.

In some embodiments, nonwoven polymer fibers of each of the second insulating plates may be intertwined with each other to form a space around the intertwined nonwoven polymer fibers. The first insulating plate may be bonded by thermal fusion to a second insulating plate adjacent to the first insulation plate. The another first insulating plate may be bonded by thermal fusion to a second insulating plate adjacent to the another first insulation plate. When the electrode assembly is moved downwardly, the space may become smaller or may be removed, and the second insulating plates may become closer to each other, thereby causing the second insulator to be contracted along a vertical section. The contraction of the second insulator can reduce downward movement of the electrode assembly and absorb some or all of pressure applied to the lower end of the electrode assembly.

In some embodiments, the electrode assembly may be formed as a jelly-roll of the cathode formed in a sheet shape, the separating membrane formed in a sheet shape, and the anode formed in a sheet shape that are stacked and wound in a direction from an end of the jelly-roll to the other end thereof.

The above and other aspects and embodiments of the present invention are described in more detail below.

BRIEF DESCRIPTION OF THE DRAWINGS

The drawings are provided for reference in describing exemplary embodiments of the present disclosure and the spirit of the present disclosure should not be construed only by the accompanying drawings.

FIGS. 7A and 7B illustrate a secondary battery in the related art and a secondary battery according to an exemplary embodiment of the present disclosure, respectively.

DETAILED DESCRIPTION

Figure 1:
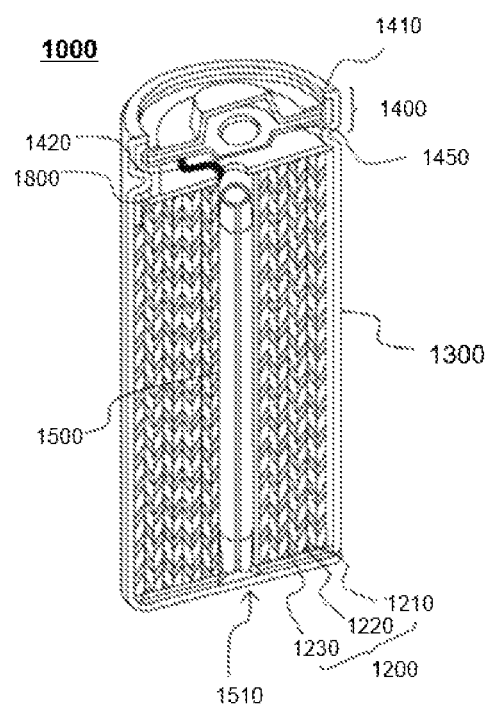
FIG. 1 is an exemplary schematic view of a cylindrical secondary battery in the related art.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element.

As used herein, the singular forms "a", "an" and "the" are intended to include the plural forms as well, unless the context clearly indicates otherwise. In addition, unless explicitly described to the contrary, the word "comprise" and variations such as "comprises" or "comprising" will be understood to imply the inclusion of stated elements but not the exclusion of any other elements. Further, the terminologies described in the specification, such as "unit", "means", "part", "member, etc refer to units performing at least one function or operation. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a secondary battery that may include an electrode assembly and an insulator assembly that insulates the electrode assembly from an interior surface of a battery container and may be elastically contracted and restored. The insulator assembly may reduce pressure generated between the interior surface of the battery container and the electrode assembly by reducing deformation of a structure of the electrode assembly on the upper end or the lower end thereof.

A secondary battery may include a structure having an electrode assembly that includes a cathode, an anode, and a separating membrane mounted in a battery container (e.g., cylindrical container). The secondary battery may include an insulator assembly mounted on at least one of an upper end and a lower end of the electrode assembly to secure the insulation and/or provides an electrolytic solution flow path. When the electrode assembly is actuated in a vertical direction (e.g., moves up and down) due to inertia, the insulator assembly may be elastically contracted and restored as a reaction to the inertia to reduce pressure generated between an interior surface of the battery container and the electrode assembly.

The secondary battery according to the present disclosure may include the insulator assembly that is elastically contractible in response to the movement of the electrode assembly although the electrode assembly is actuated in a vertical direction in the battery container. Accordingly, the pressure generated between the interior surface of the battery container and the electrode assembly may be reduced as much as the inertia force by which the insulator assembly is contracted. Therefore, press or deformation may be significantly reduced in response to the movement of the electrode assembly.

In the secondary battery, the insulator assembly may include at least one selected from the group consisting of (i) at least one first insulating plate having a plate-like structure and formed of a woven structure of polymer fibers, (ii) at least one second insulating plate having a plate-like structure and formed of a nonwoven structure of polymer fibers, and (iii) at least one third insulating plate having a plate-like structure, formed of a nonwoven or woven structure of polymer fibers, and provided with a plurality of bored apertures. The polymer fibers may be formed from of various materials and may be formed of one or a mixture of two or more materials selected from the group consisting of polyethylene (PE), polyethylene terephthalate (PET), polypropylene (PP), polytetrafluoroethylene (PTFE), polyvinylidene fluoride (PVDF), and polyvinyl chloride (PVC), for example; however, the examples thereof are not limited thereto.

Additionally, the insulator assembly may include a first insulator coupled to the upper end of the electrode assembly and a second insulator coupled to the lower end of the electrode assembly. The first insulator may provide a flow path for an electrolytic solution to inject the electrolytic solution to the upper end of the electrode assembly. Accordingly, the first insulator may include the third insulating plates provided with the plurality of apertures and may include a structure having the third insulating plates stacked to provide communication between the apertures of the individual third insulating plates.

The first insulating plate may include an opening at a position that does not overlap the apertures of the third insulating plates, to provide an outlet for an electrode lead of the electrode assembly. A detailed structure of the first insulator may include the first insulating plates stacked, respectively, on the upper end and the lower end of the stacked body that includes a plurality of the third insulating plates having the nonwoven structure that may be stacked to vertically overlap each other. In other words, in the first insulator, nonwoven fibers of the individual third insulating plates may be intertwined with each other. The first insulating plates may be bonded to adjacent third insulating plates by thermal fusion, respectively, and a space (cavity) may be formed around the intertwined nonwoven fibers.

In this structure, when the electrode assembly is actuated in an upward direction, the first insulator may be contracted along a vertical section thereof to have a shape of the third insulating plates approaching each other as the space is reduced or removed. The contraction of the first insulator may cause the electrode assembly to be obstructed from being actuated in an upward direction and may cause some or all of pressure applied to the upper end of the electrode assembly to be absorbed. The third insulating plates are not bonded to each other through the thermal fusion. The third insulating plates individually maintain independent shapes and may provide sufficient cavities between the nonwoven fibers intertwined with each other. In particular, a contracting range of the first insulator may be increased and the first insulator may be elastically restored as the nonwoven fibers are restored from the intertwined state thereof upon removal of an external force.

Additionally, when the first insulating plates and the third insulating plates are subjected to the thermal fusion, fused fibers may form projections. The projections may cause the electrolytic solution to flow during the injection of the electrolytic solution. The individual insulating plates may include fine apertures (e.g., pores) formed in the non-woven fibers. The fine pores may be about 100 micrometers to about 200 micrometers to prevent foreign matter from passing through the pores while enabling the electrolytic solution to pass therethrough.

Accordingly, in the secondary battery according to the present disclosure, the electrolytic solution may be injected into a jelly-roll through the fine apertures of the first insulator during the injection of the electrolytic solution. Therefore, the foreign matter having a size of hundreds of micrometers or greater may be restricted from being injected into the jelly-roll. Accordingly, the manufacturing processability may be significantly improved because a process of selecting and removing such foreign matter is omitted.

In particular, in the present disclosure, the first insulator may include the multi-layer structure in which the plurality of insulating plates are stacked. The foreign matter may be filtered through each of the insulating plates and a phenomenon in which foreign matter reaches the electrode assembly rarely occurs.

In another exemplary embodiment, the individual insulating plates may include fine apertures (e.g., pores) having different sizes. As a result, the foreign matter with various sizes may be filtered through the individual insulating plates. Positions of and intervals between the fine pores are not limited in a range in which prevention of foreign matter, an injection property of the electrolytic solution and a gas discharge property may be preserved. The first insulator may have a thickness to buffer effects on the electrode assembly and the secondary battery is not increased in volume. According to an exemplary embodiment, the first insulator may be about 1 mm to about 2 mm in thickness. In order to obtain this thickness, the first insulator may include two to four third insulating plates and a pair of first insulating plates.

When the first insulator is less than about 1 mm in thickness, a reduced degree of contraction may obtained. Accordingly, it is not possible to expect a reduction in pressure generated between the interior surface of the battery container and the electrode assembly. However, it is not desirable that the first insulator is greater than about 2 mm in thickness since the increased thickness precludes smooth injection of the electrolytic solution, a battery case is designed to have a relatively greater size, or the electrode assembly is designed to have a relatively smaller volume.

The insulating plates that constitute the first insulator may be individually designed in a range of thickness that satisfies the thickness of the first insulator. The third insulating plates, which enable the first insulator to be elastically contracted and restored, have a relatively greater thickness than the first insulating plates. Specifically, each of the third insulating plates may be about 0.2 mm to about 0.5 mm in thickness, and each of the first insulating plates may be about 0.1 mm to about 0.3 mm in thickness.

The second insulator may include structure with the first insulating plates stacked respectively on the upper end and the lower end of a stacked body and the second insulating plates may be stacked to vertically overlap each other. A detailed structure of the second insulator may include the first insulating plates stacked respectively on the upper end and the lower end of the stacked body including a plurality of the second insulating plates stacked to vertically overlap each other. In particular, nonwoven fibers of the individual second insulating plates may be intertwined with each other. The first insulating plates may be bonded to adjacent second insulating plates by thermal fusion, respectively, and a space (cavity) may be formed around the intertwined nonwoven fibers.

In another exemplary embodiment, the first insulating plate and the second insulating plate may include an outlet for an electrode lead of the electrode assembly. When the electrode assembly moves downwardly, the second insulator may be contracted along a vertical section thereof to have a shape of the second insulating plates approaching each other as the cavity is reduced or removed. The contraction of the second insulator may cause the electrode assembly to be obstructed from being actuated in a downward direction and may result in some or all of pressure applied to the lower end of the electrode assembly to be absorbed. The second insulating plates may not be bonded to each other through the thermal fusion. In this structure, the second insulating plates may individually maintain independent shapes. Accordingly, sufficient spaces between the nonwoven fibers intertwined with each other may be provided. In other words, a contracting range of the second insulator may be increased and the second insulator may be elastically restored due to the intertwined nonwoven fibers.

The second insulator may have a thickness by which it is possible to buffer effects on the electrode assembly and the secondary battery may minimally increase the volume. According to an exemplary embodiment, the second insulator may be about 2 mm to about 5 mm in thickness. In order to obtain this thickness, the second insulator may include five to ten second insulating plates and a pair of first insulating plates. The second insulator may be positioned between the electrode assembly and the bottom surface of the completely sealed battery container. The second insulator may have a relatively greater thickness than the first insulator that has a cavity formed between the top cap and the upper end of the electrode assembly. When the second insulator is less than 2 mm in thickness, a relatively smaller degree of contraction may be obtained and a reduction in pressure generated between the interior surface of the battery container and the electrode assembly may not occur.

The insulating plates that constitute the second insulator may be individually designed in a range of thickness that satisfies the thickness of the second insulator. The second insulating plates that enable the second insulator to be elastically contracted and restored may have relatively greater thickness than the first insulating plates. Specifically, each of the second insulating plates may be about 0.2 mm to about 0.5 mm in thickness and each of the first insulating plates may be about 0.1 mm to about 0.3 mm in thickness.

In the present disclosure, the electrode assembly may form a jelly-roll of the cathode, the separating membrane, and the anode that have a sheet shape having a length longer than a width are overlapping each other in order, and are wound in an overlapping direction from one end portion to the other end portion. The secondary battery according to the present disclosure may be applied to a lithium secondary battery manufactured by impregnating the jelly-roll with a lithium-containing electrolytic solution. Generally, the lithium secondary may include a cathode, an anode, a separating membrane, a nonaqueous electrolytic solution containing a lithium salt, and the like. Slurry obtained by mixing a cathode mixture containing a cathode active material and selectively a conductive material, a binder, fillers, or the like in a solvent such as NMP is applied on a cathode collector, and then drying and rolling may be performed to manufacture the cathode.

Examples of the cathode active materials include a layered compound such as lithium cobalt oxide ($LiCoO_2$) or lithium nickel oxide ($LiNiO_2$) or a compound substituted with one or more transition metals; lithium manganese oxide having a chemical formula of $Li_{1+y}Mn_{2-y}O_4$ (here, y is 0 to 0.33), $LiMnO_3$, $LiMn_2O_3$, or $LiMnO_2$, lithium copper oxide ($Li_2CuO_2$); vanadium oxide such as $LiV_3O_8$, $LiFe_3O_4$, $V_2O_5$, or $Cu_2V_2O_7$; Ni-site type lithium nickel oxide represented by a chemical formula of $LiNi_{1-y}M_yO_2$ (here, M is Co, Mn, Al, Cu, Fe, Mg, B, or Ga, and y is 0.01 to 0.3); lithium manganese composite oxide represented by a chemical formula of $LiMn_{2-y}M_yO_2$ (here, M is Co, Ni, Fe, Cr, Zn, or Ta, and y is 0.01 to 0.1) or $Li_2Mn_3MO_8$ (here, M is Fe, Co, Ni, Cu, or Zn); $LiMn_2O_4$ in which a part of Li in the chemical formula is substituted with alkaline earth metal ions; a disulfide compound; $Fe_2(MoO_4)_3$, and the like; however, the examples are not limited thereto.

Generally, the cathode collector may be made to be about 3 μm to about 500 μm in thickness. There is no particular limitation to the cathode collector as long as the cathode collector has conductivity without causing a chemical change to the battery. For example, as the cathode collector, it is possible to use stainless steel, aluminum, nickel, titanium, calcined carbon, a material obtained by performing surface treatment on a surface of aluminum or stainless steel with carbon, nickel, titanium, or silver, or the like. The collector may have fine unevenness on a surface thereof, and thereby it is possible to increase adhesion of the cathode active material thereto. The collector may have various shapes of a film, a sheet, foil, a net, a porous body, foam, and nonwoven fabric.

The conductive material may be added by about 1 to 30 wt % with a total weight of the mixture containing the cathode active material as a reference. The conductive material is not limited as long as the conductive material has conductivity without causing a chemical change to the battery. For example, conductive materials such as graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride powder, aluminum powder, or nickel powder; conductive whiskey such as zinc oxide or potassium titanate; conductive metal oxide such as titanium oxide; or a polyphenylene derivative may be used.

The binder may be an ingredient that assists a combination of the active material, the conductive material, and the like, and a combination of the collector and the active material and may be added by about 1 to 30 wt % with the total weight of the mixture containing the cathode active material as a reference. Examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like. The fillers may be selectively used as an ingredient that suppresses expansion of the cathode and there is no particular limitation to the fillers provided the fillers are fiber materials without causing a chemical change to the battery. For example, an olefin-based polymer such as polyethylene or polypropylene; or a fibrous material such as glass fiber or carbon fiber may be used.

The separating membrane may be interposed between the cathode and the anode, and an insulating thin membrane having high ion permeability and mechanical strength may be used. The separating membrane may include pores that are about 0.01 μm to about 10 μm in diameter. The separating membrane may be about 5 μm to about 300 μm in thickness. For example, as the separating membrane, olefin polymer such as polypropylene having chemical resistance and hydrophobicity; or a sheet or nonwoven fabric made of glass fibers, polyethylene, or the like may be used. In a case where a solid electrolyte such as a polymer is used as an electrolyte, the solid electrolyte may serve as the separating membrane. For example, an anode mixture containing an anode active material may be applied on an anode collector and, then, may be dried. In this manner, it is possible to manufacture the anode, and the ingredients described above may be contained in the anode mixture as necessary. For example, the anode active material may include carbon such as nongraphitized carbon or graphite carbon; metal complex oxide such as $Li_xFe_2O_3$ (0≤x≤1), $Li_xWO_2$ (0≤x≤1), or $Sn_xMe_{1-x}Me'_yO_z$ (Me: Mn, Fe, Pb, or Ge; Me': Al, B, P, Si, group I, II, and III elements and halogens in the periodic table; 0<x≤1; 1≤y≤3; and 1≤z≤8); lithium metal; lithium alloy; silicon-based alloy; tin alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$, conductive polymer such as polyacetylene; a Li—Co—Ni-based material or the like.

In general, the anode collector may be made to be about 3 μm to about 500 μm in thickness. There is no particular limitation to the anode collector as long as the anode collector has high conductivity without causing a chemical change to the battery. For example, as the anode collector, copper, stainless steel, aluminum, nickel, titanium, calcined carbon, a material obtained by performing surface treatment on a surface of copper or stainless steel with carbon, nickel, titanium, or silver, an aluminum-cadmium alloy, or the like may be used. Similar to the cathode collector, the anode collector may have fine unevenness on a surface thereof, and thereby the increase adhesion of the anode active material thereto may be increased. The anode collector may have various shapes of a film, a sheet, foil, a net, a porous body, foam, and nonwoven fabric.

The electrolytic solution may be a nonaqueous electrolytic solution containing a lithium salt, which consists of an electrolytic solution and the lithium salt. As the electrolytic solution, a nonaqueous organic solvent, an organic solid electrolyte, an inorganic solid electrolyte, or the like is used. For example, as the nonaqueous organic solvent, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy franc, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, a dioxolane derivativ, sulfolane, methyl sulfolane, 1,3-dimethyl-2-imidazolidinone, a propylene carbonate derivative, a tetrahydrofuran derivative, ether, methyl propionate, and ethyl propionate may be used For example, as the organic solid electrolyte, a polymer containing a polyethylene derivative, a polyethylene oxide derivative, a polypropylene oxide derivative, phosphate ester polymer, poly-agitation lysine, polyester sulfide, polyvinyl alcohol, polyvinylidene fluoride, or an ionically dissociating group may be used. For example, as the inorganic solid electrolyte, a Li nitride such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$, a halide, a sulfate, or the like may be used. The lithium salt may be a substance more easily dissolved in the nonaqueous electrolyte. For example, as the lithium salt, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic carboxylic acid lithium, lithium tetraphenylborate, imide, or the like may be used.

In addition, in order to improve charge or discharge characteristics, flame retarding properties, and the like, for example, it is possible to add to the electrolytic solution pyridine, triethyl phosphite, triethanolamine, cyclic ether, ethylenediamine, N-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, or the like. In some exemplary embodiments, a solvent containing a halogen element of carbon tetrachloride, ethylene trifluoride, or the like may be added in order to impart nonflammability, additionally carbon dioxide gas may be included in order to improve high-temperature maintaining characteristics, and fluoro-ethylene carbonate (FEC), propene sultone (PRS), fluoro-propylene carbonate (FPC), or the like may be included.

EXEMPLARY EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. In order to clarify the present disclosure, parts that are not connected with the description will be omitted, and the same elements or equivalents are referred to with the same reference numerals throughout the specification. Also, the size and thickness of each element are arbitrarily shown in the drawings, but the present disclosure is not necessarily limited thereto, and in the drawings, the thickness of layers, films, panels, regions, etc., are exaggerated for clarity.

Figure 2:
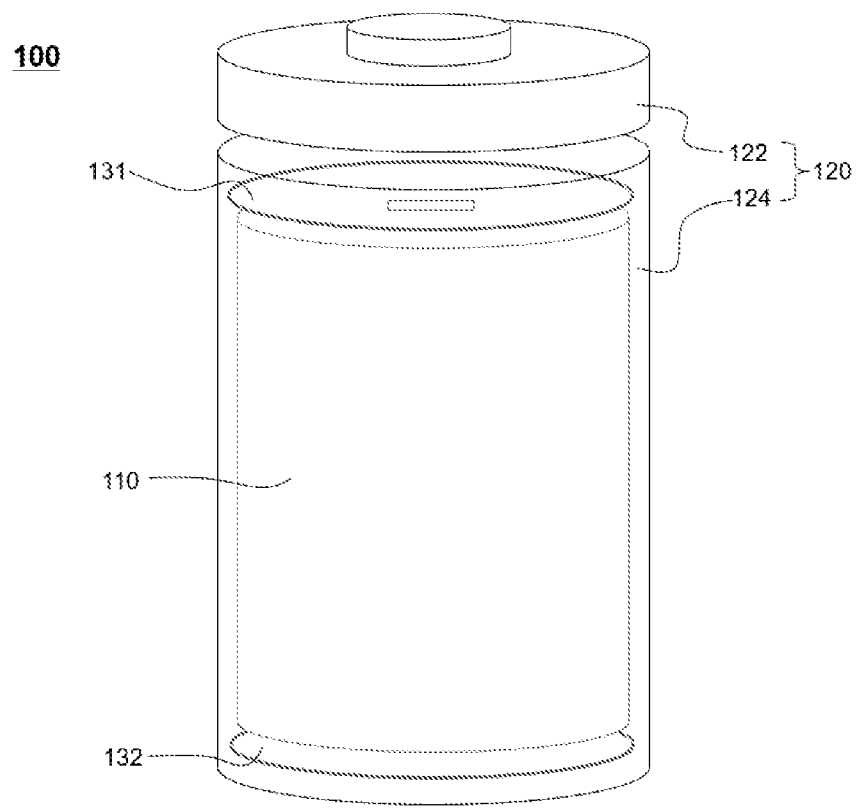
FIG. 2 is an exemplary schematic view of a secondary battery according to an exemplary embodiment of the present disclosure.
Figure 3:
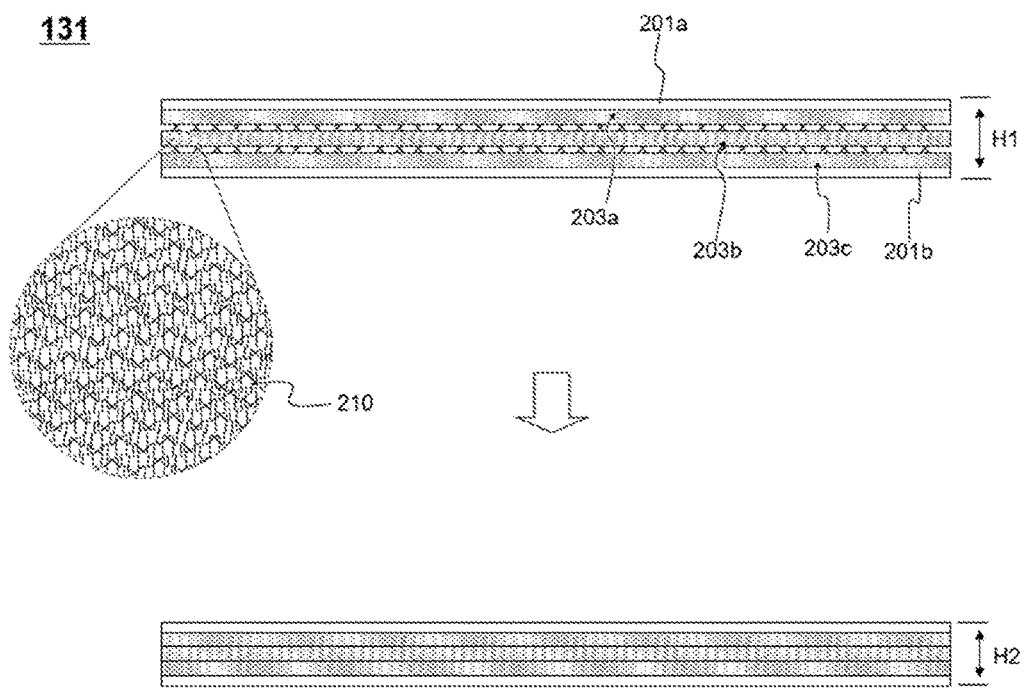
FIGS. 3 to 5 are exemplary schematic views of a first insulator according to an exemplary embodiment of the present disclosure.
Figure 4:
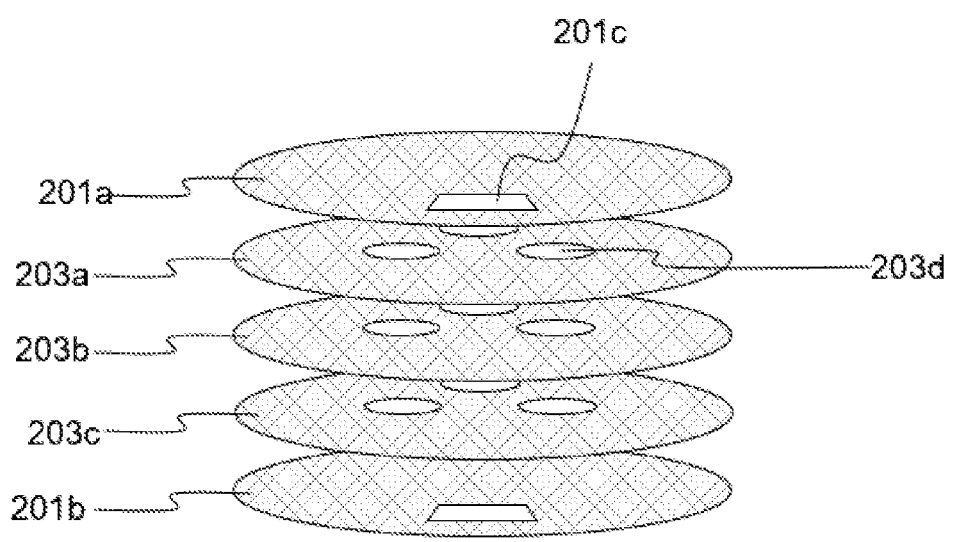
Figure 5:
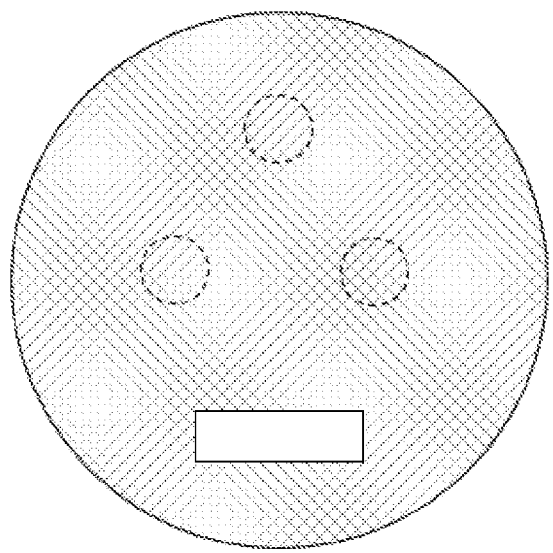

FIG. 2 illustrates an exemplary schematic view of a secondary battery according to an example of the present disclosure. With respect to FIG. 2, a secondary battery 100 has a structure in which an electrode assembly 110 including a cathode, an anode, and a separating membrane is mounted, together with an insulator assembly 131 and 132, in a cylindrical battery container 120. The electrode assembly 110 may have a jelly-roll structure in which the cathode, the separating membrane, and the anode that have a sheet shape having a length greater than a width are overlapping each other, and may be wound in a direction from one end portion to the other end portion to form an overlapping orientation. The battery container 120 may be configured to include a lower container 124 provided with an accommodating portion that corresponds to a jelly-roll shape, and a top cap 122 coupled to the upper portion of the lower container 124.

The insulator assembly 131 and 132 may be configured to include a first insulator 131 mounted on the upper end of the electrode assembly 110 and a second insulator 132 mounted on the lower end of the electrode assembly 110. The first insulator 131 and the second insulator 132 insulate the upper end and the lower end of the electrode assembly 110, respectively, and may provide an electrolytic solution flow path to the electrode assembly 110. Although the electrode assembly 110 may be actuated in a vertical direction (e.g., moves up and down) in the battery container 120, the insulators may be configured to be elastically contracted and restored in response to the movement of the electrode assembly 110 due to a multi-layer structure as illustrated in FIGS. 3 to 6.

With reference to FIGS. 3 to 6 illustrating the first insulator 131 and the second insulator 132 according to an example of the present disclosure, the structures of the insulators will be described below in detail. First, with reference to FIGS. 3 to 5, a first insulator (131) assembly may be configured to have a structure in which first insulating plates 201a and 201b having a woven structure of polymer fibers may be stacked respectively on the upper end and the lower end of a stacked body including three third insulating plates 203a, 203b, and 203c having a nonwoven structure of polymer fibers which may be stacked to vertically overlap each other. The third insulating plate may be provided with a plurality of bored apertures 203d to include a flow path for the electrolytic solution. The third insulating plates 203a, 203b, and 203c may be stacked with the apertures 203d of the individual third insulating plates 203a, 203b, and 203c communicate with each other.

The first insulating plates 201a and 201b may include an opening 201c at a position that does not overlap the apertures 203d of the third insulating plates 203a, 203b, and 203c, to provide an outlet for an electrode lead of the electrode assembly 110. In the first insulator 131, nonwoven fibers 210 of the individual third insulating plates 203a, 203b, and 203c may be intertwined with each other. The first insulating plates 201a and 20 lb may be bonded to adjacent third insulating plates 203a and 203c by thermal fusion, respectively, and a cavity may be formed around the intertwined nonwoven fibers 210. Accordingly, when the electrode assembly 110 are actuated in an upward direction, the first insulator 131 may be contracted from a first thickness H1 to a second thickness H2 illustrated in FIG. 3 to have a shape of the third insulating plates 203a, 203b, and 203c approaching each other as the cavity is reduced or removed. By such a principle, the first insulator 131 enables the electrode assembly 110 to be obstructed from being actuated in an upward direction and enables some or all of pressure applied to the upper end of the electrode assembly 110 to be absorbed.

In particular, in the present disclosure, the third insulating plates 203a, 203b, and 203c are not bonded to each other by thermal fusion, but may include a structure in which the nonwoven fibers 210 are simply intertwined. Thus, the third insulating plates 203a, 203b, and 203c individually maintain independent shapes and a sufficient cavity may be formed between the intertwined nonwoven fibers 210. Accordingly, a contracting range of the first insulator 131 may be increased, and the first insulator 131 may be elastically restored due to the intertwined nonwoven fibers 210.

Figure 6:
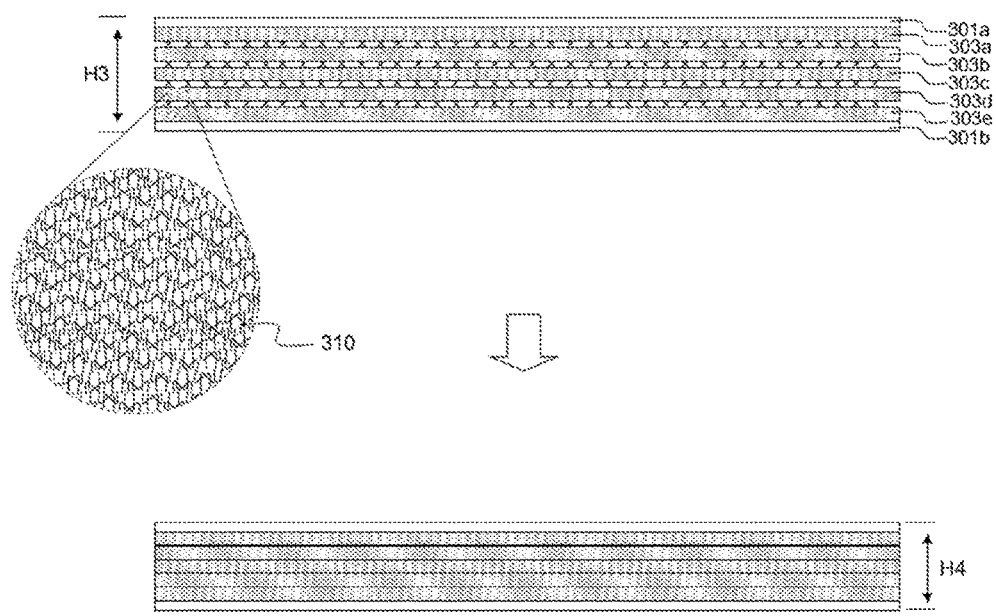
FIG. 6 is an exemplary schematic view of a second insulator according to an exemplary embodiment of the present disclosure.

FIG. 6 illustrates an exemplary schematic view of the second insulator 132. With reference to FIG. 6, a second insulator 132 may include plate-like structure and may be configured to have a structure in which first insulating plates 301a and 301b having the woven structure of polymer fibers may be stacked respectively on the upper end and the lower end of a stacked body including five second insulating plates 303a, 303b, 303c, 303d, and 303e having a nonwoven structure of polymer fibers which may be stacked to vertically overlap each other. In particular, in the second insulator 132, nonwoven fibers 310 of the individual second insulating plates 303a, 303b, 303c, 303d, and 303e may be intertwined with each other, the first insulating plates 301a and 301b are bonded to adjacent second insulating plates 303a and 303e by thermal fusion, respectively, and a cavity may be formed around the intertwined nonwoven fibers 310.

Although not illustrated in the figures, in some cases, the first insulating plates 301a and 301b and the second insulating plates 303a, 303b, 303c, 303d, and 303e may be each provided with an opening. In such a structure, when the electrode assembly 110 is actuated in a downward direction, the second insulator 132 may be contracted from a third thickness H3 to a fourth thickness H4 illustrated in FIG. 6 to have a shape of the second insulating plates 303a, 303b, 303c, 303d, and 303e approaching each other as the cavity formed by the nonwoven fibers 310 is reduced or removed. The contraction of the second insulator 132 enables the electrode assembly 110 to be obstructed from being actuated in a downward direction and enables some or all of pressure applied to the lower end of the electrode assembly 110 to be absorbed. Similar to the first insulator 131, in the second insulator 132, the second insulating plates 303a, 303b, 303c, 303d, and 303e are not bonded to each other by thermal fusion, and thus, the second insulating plates 303a, 303b, 303c, 303d, and 303e individually maintain independent shapes and a sufficient cavity may be formed between the intertwined nonwoven fibers 310. For the reason described above, it is possible to increase the contracting range of the second insulator 132.

FIGS. 7A and 7B illustrate a secondary battery in the related art and the secondary battery according to the present disclosure, respectively. With reference to FIGS. 7A and 7B along with FIGS. 2 to 6, a secondary battery 10 in the related art does not include the insulator assembly 131 and 132 of the present disclosure. In particular, when the electrode assembly is actuated in a vertical direction (e.g., up and down) within the interior of a cylindrical battery container, problems arise in that the upper end or the lower end of the electrode assembly may be compressed against a battery container due to the inertia. Accordingly, a structure of the upper end or the lower end of the electrode assembly may be pressed or deformed.

Conversely, in the secondary battery 100 according to the present disclosure including the insulator assembly 131 and 132 described above, although the electrode assembly 110 may be actuated in a vertical direction within the interior of the battery container 120, the insulator assembly 131 and 132 may be elastically contracted in response to the movement of the electrode assembly 110. Accordingly, the pressure generated between the interior surface of the battery container 120 and the electrode assembly 110 may be reduced as much as the inertia force by which the insulator assembly 131 and 132 is contracted. Therefore, in response to the movement of the electrode assembly 110 the press or deformation may be significantly reduced.

In addition, the present disclosure provides a device that may include the secondary battery as a power supply. The device according to the present disclosure may be desirably used for a light electronic vehicle (LEV), an electric vehicle, a hybrid electric vehicle, a plug-in hybrid electric vehicle, a power storage device or the like, in addition to a mobile apparatus such as a cellular phone, portable computer or the like in consideration of excellent service-life characteristic, safety, and the like. The structures and manufacturing methods of the lithium secondary battery, a medium and large battery module and a device including the lithium secondary battery as a unit battery are known in the field of the art, and thus the detailed description thereof is omitted in the present specification.

As described above, in the secondary battery according to the present disclosure, although the electrode assembly may be vertically displaced in the battery container, the insulator assembly may be elastically contracted in response to the movement of the electrode assembly. Accordingly, the pressure generated between the interior surface of the battery container and the electrode assembly may be reduced as much as the inertia force by which the insulator assembly is contracted. Therefore, press or deformation in response to the movement of the electrode assembly may be reduced.

Although the present disclosure has been described with reference to exemplary shown in the accompanying drawings, it is to be understood that the description is given by way of example only. It will be appreciated by those skilled in the art that various changes and equivalent alternative exemplary embodiments may be made without departing from the scope of the present disclosure. Accordingly, the true scope of the present disclosure should be determined by the following claims

What is claimed is:

1. A secondary battery comprising:
   a container;
   an electrode assembly that is disposed in the container and includes a cathode, an anode, and a separating membrane disposed between the cathode and the anode; and
   an insulator assembly that is mounted on an upper end of the electrode assembly, a lower end thereof, or both,
      wherein the insulator assembly includes: (i) a first insulating plate formed of a woven structure of polymer fibers, (ii) a second insulating plate formed of a nonwoven structure of polymer fibers, (iii) a third insulating plate formed of a nonwoven or woven structure of polymer fibers and provided with a plurality of apertures, or (iv) a combination thereof, and
      wherein, when the electrode assembly is moved upwardly or downwardly due to inertia, the insulator assembly is elastically contracted and restored as a reaction to the inertia to reduce pressure generated between the electrode assembly and an interior surface of the container.

2. The secondary battery according to claim 1, wherein the electrode assembly forms a jelly-roll of the cathode formed in a sheet shape, the separating membrane formed in a sheet shape, and the anode formed in a sheet shape that are stacked and wound in a direction from an end of the jelly-roll to the other end thereof.

3. The secondary battery according to claim 1, wherein the insulator assembly includes a first insulator coupled to the upper end of the electrode assembly and a second insulator coupled to the lower end of the electrode assembly.

4. The secondary battery according to claim 3, wherein the first insulator comprises:
   a stacked body in which two, three or four of the third insulating plates formed of a nonwoven structure of polymer fibers are stacked vertically;
   a first insulating plate stacked on the stacked body; and
   another first insulating plate stacked under the stacked body, wherein the thickness of the first insulator is about 1 mm to about 2 mm.

5. The secondary battery according to claim 3, the second insulator comprises:
   a stacked body in which a plurality of the second insulating plates formed of a nonwoven structure of polymer fibers are stacked vertically;
   a first insulating plate stacked on the stacked body; and
   another first insulating plate stacked under the stacked body.

6. The secondary battery according to claim 3, wherein the first insulator comprises:
   a stacked body in which a plurality of the third insulating plates formed of a nonwoven structure of polymer fibers are stacked vertically;
   a first insulating plate stacked on the stacked body; and
   another first insulating plate stacked under the stacked body.

7. The secondary battery according to claim 6, wherein each of the third insulating plates is about 0.2 mm to about 0.5 mm in thickness, and each of the first insulating plates is about 0.1 mm to about 0.3 mm in thickness.

8. The secondary battery according to claim 6, wherein nonwoven polymer fibers of each of the third insulating plates are intertwined with each other to form a space around the intertwined nonwoven polymer fibers,
   wherein the first insulating plate is bonded by thermal fusion to a third insulating plate adjacent to the first insulation plate, and
   wherein the another first insulating plate is bonded by thermal fusion to a third insulating plate adjacent to the another first insulation plate.

9. The secondary battery according to claim 8, wherein when the electrode assembly is moved upwardly, the space becomes smaller or is removed, and the third insulating plates becomes closer to each other, thereby causing the first insulator to be contracted along a vertical section thereof so that the contraction of the first insulator can reduce upward movement of the electrode assembly and absorb some or all of pressure applied to the upper end of the electrode assembly.

10. The secondary battery according to claim 6, wherein the third insulating plates are stacked so that the apertures of each of the third insulating plates are in communication with each other.

11. The secondary battery according to claim 10, wherein each of the second insulating plates is about 0.2 mm to about 0.5 mm in thickness, and each of the first insulating plates is about 0.1 mm to about 0.3 mm in thickness.

12. The secondary battery according to claim 10, wherein the second insulator comprises:
   a stacked body in which five to ten of the second insulating plates formed of a nonwoven structure of polymer fibers are stacked vertically;
   a first insulating plate stacked on the stacked body; and
   another first insulating plate stacked under the stacked body,
   wherein the thickness of the second insulator is about 2 mm to about 5 mm.

13. The secondary battery according to claim 10, wherein nonwoven polymer fibers of each of the second insulating plates are intertwined with each other to form a space around the intertwined nonwoven polymer fibers,
   wherein the first insulating plate is bonded by thermal fusion to a second insulating plate adjacent to the first insulation plate, and
   wherein the another first insulating plate is bonded by thermal fusion to a second insulating plate adjacent to the another first insulation plate.

14. The secondary battery according to claim 13, wherein when the electrode assembly is moved downwardly, the space becomes smaller or is removed, and the second insulating plates becomes closer to each other, thereby causing the second insulator to be contracted along a vertical section thereof so that the contraction of the second insulator can reduce downward movement of the electrode assembly and absorb some or all of pressure applied to the lower end of the electrode assembly.

* * * * *